July 13, 1948.   C. S. TEGGE   2,445,159
THERMOCOUPLE TUBE WITH EXPOSED JUNCTIONS
Filed Aug. 12, 1943

INVENTOR.
CARLTON S. TEGGE
BY
*C. B. Spangenberg*
ATTORNEY.

Patented July 13, 1948

2,445,159

UNITED STATES PATENT OFFICE 2,445,159

THERMOCOUPLE TUBE WITH EXPOSED JUNCTION

Carlton S. Tegge, Haddon Heights, N. J., assignor to The Brown Instrument Company, Philadelphia, Pa., a corporation of Pennsylvania Application August 12, 1943, Serial No. 498,328

6 Claims. (Cl. 136—4)

The present invention relates to thermocouples, and more particularly to a thermocouple assembly having an exposed hot junction, which assembly may be used in connection with a closed container under pressure, or in any other desired place.

It has been customary, when measuring temperatures with a thermocouple, to insert a closed end protecting tube in the wall of the container or other space and to place a thermocouple in the protecting tube. In a great many places this construction is satisfactory, but in many others it is not, because the temperature of the protecting tube has to be changed before the temperature of the thermocouple can be changed. Where it is necessary to get an accurate and quick reading of the temperature changes, the lag produced by this construction is objectionable.

It is an object of this invention to provide a thermocouple assembly in which the thermocouple hot junction is exposed to the medium whose temperature is being measured. It is a further object of the invention to provide a thermocouple assembly in which a protecting tube is joined in pressure tight relation with the elements forming the thermocouple itself.

It is a further object of the invention to provide a thermocouple assembly in which all of the thermocouple but the hot junction is encased in a protecting tube with the feature that the construction is pressure tight and that the hot junction is exposed to the temperature to be measured. Such a construction produces a thermocouple which is fast in its response to temperature changes and which may be used in places where ordinary thermocouple constructions are unsatisfactory because of the lag which is involved in measuring temperature changes.

The various features of novelty which characterize my invention are pointed out with particularity in the claims annexed to and forming a part of this specification. For a better understanding of the invention, however, its advantages and specific objects obtained with its use, reference should be had to the accompanying drawings and descriptive matter in which I have illustrated and described a preferred embodiment of the invention.

Figure 1:
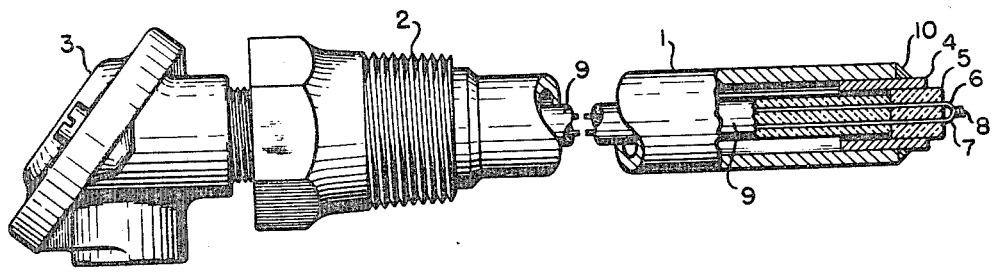
Figure 1 is a view, partly in section, of one form of my invention.

Referring first to Figure 1 there is shown a thermocouple protecting tube 1 of steel or other suitable material which is adapted to be fastened in the wall of a container or vessel by means of a threaded portion 2. The tube has attached to its left end a thermocouple head 3 in which are located the conventional terminals for the thermocouple wires and terminals by means of which the thermocouple can be connected to a suitable measuring instrument through the use of extension leads. The right end of the protecting tube 1 is cut off as is shown in the figure and has received in it a short tubular member 4 which in turn receives in it a glass or other fusible, insulating member 5. This latter member is provided with openings through which the thermocouple wires 6 and 7 may extend. The wires are joined together at the right of member 5, as shown at 8, to form the hot junction of the thermocouple and to the left of member 5 extend through suitable insulators 9 to the thermocouple head 3. Insulators 9 are preferably made of some ceramic and serve to separate and support the thermocouple wires in their passage through the protecting tube 1.

In the making of this thermocouple assembly, the thermocouple wires 6 and 7 are placed through suitable openings that are provided in the member 5 and this member is then placed within the bore of the tubular member 4 that is made of a metal which preferably has a coefficient of expansion substantially the same as that of the member 5. The tubular member 4 may be made of Kovar which is an alloy of iron, nickel and cobalt, but it may also be made of any material which has a suitable coefficient of expansion with respect to that of the glass insert 5. This assembly is then heated in a suitable furnace until the member 5 will flow into intimate contact with the wires 6 and 7 and with the tube 4, fusing them together, in order to make a pressure-tight seal between the various components. After this is done the tube 4 is inserted in the outer end of the protecting tube 1 and welded thereto as shown at 10 in order to form a pressure tight junction between the tube 4 and the protecting tube 1.

From the above it will be seen that there is provided a thermocouple assembly in which the thermocouple wires are suitably protected but in which the hot junction itself is exposed to the medium whose temperature is being measured. By the construction that has been described a pressure tight union is obtained between each of the components of the thermocouple assembly so that when the protecting tube is immersed in a space which is under pressure the pressure will not be lost. This provides a thermocouple which is extremely sensitive to temperature changes and which may be used inside of vessels under pressure.

Figure 2:
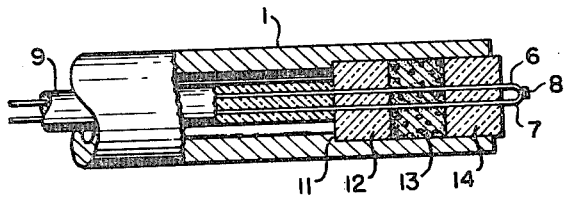
Figure 2 is a view, partly in section, of a modified form of my invention.

The construction shown in Figure 2 is adapted to perform the same function as that described in connection with Figure 1, but is made in a slightly different manner. In this embodiment of the invention the tube 1 is counter-bored to form an internal shoulder 11. Against this shoulder there is placed a ceramic member 12 through which are provided openings that snugly receive the thermocouple wires 6 and 7. The member 12 is held in place in the tube 1 by means of a suitable cement 13 which serves to make a pressure tight connection with the interior walls of the protecting tube and at the same time closely surrounds the thermocouple wires so that a pressure tight connection is also made with them. A second ceramic member 14, similar to the member 12 is inserted in the outer end of the protecting tube in order to keep the cement in place. This member also serves to compress the cement tightly against the first member 12 and against the walls of the protecting tube. In addition to supporting the wires 6 and 7, members 12 and 14 serve to insulate them from each other. It is noted that the member 14 is held in place by the cement.

In forming this type of thermocouple, the thermocouple wires are threaded through the members 12 and 14, and the member 12 is placed in position in the protecting tube 1. While the members 12 and 14 are separated the proper amount of cement 13 is placed in the open end of the tube. Thereafter a member 14 is placed into the open end of the protecting tube and moved toward the left with sufficient force to compress the cement until a pressure tight joint is formed. Any suitable type of cement which is capable of forming a bond between the parts may be used, provided this cement is capable of withstanding the maximum temperature to which the thermocouple will be subjected. It is noted that the pressure to which the thermocouple is subjected pushes the parts 12, 13 and 14 toward the shoulder 11 to help retain the parts of the assembly in position.

Figure 3:
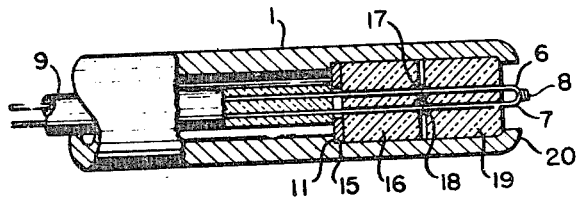
Figure 3 is a view, partly in section, of another modified form of my invention.

There is shown in Figure 3 another type of thermocouple which may be made in accordance with my invention, and which depends on another method of assembly in order to obtain the pressure tight joint. In this embodiment of the invention a washer 15 which may be made of asbestos, soft copper or other suitable material is placed against the shoulder 11 formed in the protecting tube 1, and a ceramic insulating member 16 is moved into the end of the protecting tube to hold this washer in place. Thereafter the thermocouple wires 6 and 7, each having placed on them beads 17 and 18 of a material similar to that of which the washer 15 is formed, are threaded through openings provided in the member 16. A second ceramic insulating member 19 is then threaded on the ends of the thermocouple wires to the position shown. These members are held in place and are forced tightly toward the shoulder 11 of the protecting tube by spinning over the end of the protecting tube as shown at 20. This operation will move the ceramic member 16 against the washer 15 with sufficient force to make a pressure tight joint between this washer and the protecting tube. The member 19 will be moved toward the member 16 with sufficient force to compress the beads 17 and 18 to make a pressure tight joint between these members and the wires 6 and 7 so that there can be no leakage around the thermocouple wires and through the members 16 and 19. After the assembly is made in the manner that has been described the ends of the thermocouple wires 6 and 7 are joined to form the hot junction 8.

From the above description it will be seen that I have provided a thermocouple assembly which is so designed that a bare thermocouple hot junction may be exposed to the medium whose temperature is to be measured to thus insure a highly sensitive measuring element. This construction also is so assembled that it may be inserted in a vessel under high pressure without the loss of pressure due to the insertion of the thermocouple. The construction described, furthermore, is easy to make and is inexpensive in addition to being very efficient for its designed purpose.

While in accordance with the provisions of the statutes I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. A thermocouple assembly comprising a pair of thermocouple wires, a glass member surrounding said wires and in intimate engagement with the same, a tube having the same coefficient of expansion as said glass member receiving the same and integrally fastened to the member, a protecting tube adapted to extend through an opening and be fastened to the wall of a space whose temperature is to be measured, said protecting tube having an open end, and means to integrally attach said first mentioned tube to the open end of said protecting tube whereby a pressure tight construction is obtained and the thermocouple assembly serves to plug said opening.

2. A thermocouple assembly comprising a pair of wires joined at their hot ends to form a hot junction, a fusible insulating member surrounding said wires adjacent said hot junction and being sealed in pressure tight relation thereto with the hot junction exposed, a cylindrical metal part surrounding and integrally attached thereto, said part having a coefficient of expansion substantially the same as that of said fusible member, a protecting tube having an open end, means to fasten said cylindrical part in the open end of said protecting tube in pressure tight relation thereto, whereby said hot junction projects beyond the open end of said protecting tube and is insulated therefrom and the entire assembly may be inserted in a space under pressure without the loss of pressure therefrom.

3. A thermocouple assembly comprising a protecting tube having an open end, said tube being counterbored so that it is provided with an internal shoulder, an insulating member received by said tube and tightly engaging said shoulder, a body of cement acting to hold said member in said tube, a second insulating member also received by said tube beyond the body of cement and held in place by the same, a pair of thermocouple wires, said members having openings in them through each of which said pair of thermocouple wires is threaded, the cement closely surrounding said wires, whereby the open end of said protecting tube is closed and the thermocouple wires are exposed beyond the end of the same.

4. A thermocouple assembly comprising an open ended protecting tube having an internal shoulder therein, a plurality of insulating plugs received in the open end of said protecting tube, one of said plugs resting against said shoulder, a body of bonding material between each of said plugs and in intimate engagement therewith and with the interior of said protecting tube, a pair of thermocouple wires, each of said plugs being provided with openings through which said thermocouple wires pass so that they extend from the interior of said protecting tube to the exterior thereof, the outer ends of said thermocouple wires being joined to form a hot junction.

5. A thermocouple assembly comprising an open ended protecting tube provided with an internal shoulder, an annular gasket member engaging said shoulder, a pair of plugs received in said tube, one of them engaging said member, a pair of thermocouple wires, each of said plugs being provided with openings through which said wires may be passed, an enlargement on each thermocouple wire and located between said plugs, and means to force said plugs together against said enlargements and said one plug against said gasket.

6. A thermocouple assembly comprising a protecting tube formed with an internal shoulder, a pair of thermocouple wires extending through said protecting tube, a plurality of insulating members received in said tube, each of said members being provided with openings through which said wires pass, an enlargement on each wire located between said members, means to force said members toward each other to compress said enlargements and toward said shoulder, and a gasket located between one of said members and said shoulder, said thermocouple wires being joined to make a thermocouple hot junction at a point beyond the last of said members.

CARLTON S. TEGGE.

REFERENCES CITED

The following references are of record in the file of this patent:

UNITED STATES PATENTS

| Number | Name | Date |
| --- | --- | --- |
| 869,668 | Thwing | Oct. 29, 1907 |
| 935,154 | Hopkins | Sept. 28, 1909 |
| 1,054,442 | Nice | Feb. 25, 1913 |
| 1,367,026 | Drinker | Feb. 1, 1921 |
| 1,422,672 | Coghlan | July 11, 1922 |
| 2,022,529 | Townsend | Nov. 26, 1935 |
| 2,137,057 | Mason | Nov. 15, 1938 |
| 2,218,622 | Rabezzana | Oct. 22, 1940 |
| 2,223,408 | Dietert | Dec. 3, 1940 |
| 2,258,809 | Rabezzana | Oct. 14, 1941 |
| 2,318,479 | Gillis | May 4, 1943 |

OTHER REFERENCES

Williams, A., Trans A. S. M. E., vol. 57 (1935), p. 497. (Copy in Div. 60.)

Leeds et al., Catalog N33-162 (1937), p. 26. (Copy in Div. 60.)